July 9, 1935. G. W. BAUGHMAN Re. 19,633
RAILWAY TRAFFIC CONTROLLING APPARATUS
Original Filed May 23, 1930
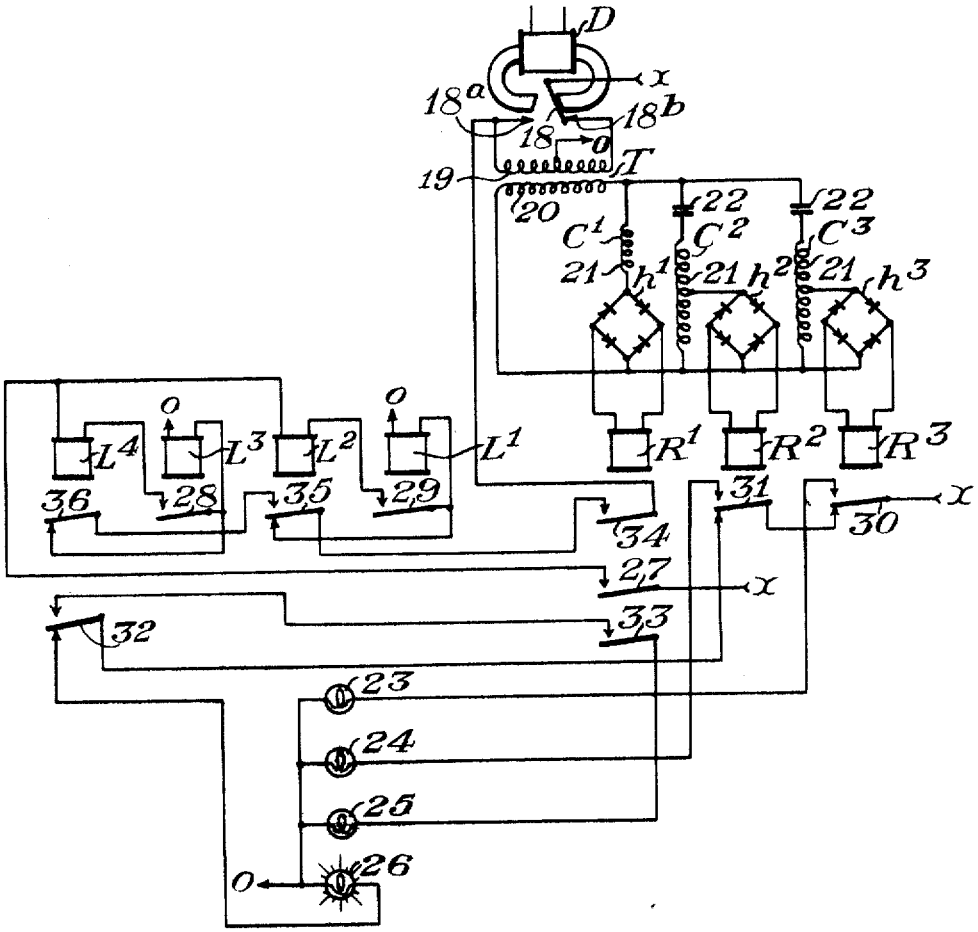
INVENTOR:
G. W. Baughman,
by A. L. Vennell
His Attorney Reissued July 9, 1935

Re. 19,633

UNITED STATES PATENT OFFICE 19,633

RAILWAY TRAFFIC CONTROLLING APPARATUS

George W. Baughman, Pittsburgh, Pa., assignor to The Union Switch & Signal Company, Swissvale, Pa., a corporation of Pennsylvania Original No. 1,797,314, dated March 24, 1931, Serial No. 454,926, May 23, 1930. Application for reissue February 20, 1935, Serial No. 7,463

8 Claims. (Cl. 246—63)

My invention relates to railway traffic controlling apparatus, and particularly to apparatus of the type comprising train carried governing means controlled by energy received from the trackway.

One of the features of my present invention is the provision of means for preventing the display of a false indication on a train due to shock excitation of the train carried apparatus when the train is operating outside of train control territory.

I will describe one form of apparatus embodying my invention, and will then point out the novel features thereof in claims.

The accompanying drawing is a diagrammatic view illustrating one form of train carried apparatus embodying my invention.

Referring to the drawing, the reference character D designates the train carried polarized master relay of a cab signaling apparatus, such as that disclosed in United States patent to Lloyd V. Lewis No. 1,986,679, dated January 1, 1935, for Railway traffic controlling apparatus. This relay is provided with a contact 18 which is connected with a terminal $x$ of a suitable source of direct current, and which oscillates between contacts 18$^a$—18$^b$ at a frequency corresponding to that of the code being transmitted to the train during such time as the train is in train control territory.

Associated with the master relay D is a transformer T comprising a primary 19 and a secondary 20. The primary 19 of this transformer has its end terminals connected with the contacts 18$^a$ and 18$^b$, respectively, of the relay D, and an intermediate point of the primary is connected with a terminal $o$ of the source of direct current. The secondary 20 of the transformer T is connected with a plurality of parallel circuits each designated by the reference character C with a distinguishing exponent. When the relay D is energized in one direction to close contact 18—18$^a$, current flows from terminal $x$ through the left-when the relay D is energized in the opposite direction to close contact 18—18$^b$, current flows hand portion of primary 19 in one direction, but from terminal $x$ through the right-hand portion of primary 19 in the opposite direction. It follows that when the polarity of the current supplied to relay D is periodically reversed, the current in the primary 19 of transformer T is periodically reversed at the frequency of the operation of relay D. As a result of this, there is induced in the secondary 20 a low frequency alternating electromotive force which is supplied to the circuits C.

The circuits C each include a reactor 21 and a rectifier $h$ having distinguishing exponents. In addition, the circuits $C^2$ and $C^3$ each include a condenser 22 and are tuned to resonance at code frequencies of 120 and 180 cycles per minute respectively. The circuit $C^1$, however, is responsive to all of the code frequencies employed, that is to say, to frequencies between 80 and 180 cycles per minute. Decoding relays $R^1$, $R^2$ and $R^3$ are connected across the rectifiers $h^1$, $h^2$ and $h^3$, respectively, and control a plurality of signal lamps 23, 24, 25 and 26 located in the cab, according to the particular code being received, in a manner presently to be described. These lamps are adapted to display different indications according to various trackway conditions. For example, as is the practice on certain railroads, the lamps 23, 24, 25 and 26 may be employed to indicate "clear," "approach restricted," "approach," and "caution" or slow speed, respectively. By reason of the tuned circuits above described, an 80 cycle code will cause the energization of relay $R^1$ only, a 120 cycle code will cause the energization of the relays $R^1$ and $R^2$, and a 180 cycle code will cause the energization of relays $R^1$ and $R^3$.

It will be apparent from the foregoing that relay $R^1$ is energized when relay D is operating at any of the train control frequencies and, therefore, by reason of this characteristic, it may also be responsive to certain surges of current that may be produced in the track rails from other causes such as by crossovers, imperfect rail bonding, changes from single to double track, heavy loads, etc., while the train is operating outside of train control territory. During the time that the train occupies train control territory, the operation of the apparatus is not seriously affected by shock excitations, as explained in the Lewis patent above referred to, but when the train is operating outside of such territory, rapidly repeated shock excitations may cause the apparatus to function so as to illuminate the lamp 25 and display a false "approach" indication in the cab. These indications are sometimes of a duration sufficient to require an acknowledgment by the engineer in order to avoid an automatic application of the brakes, and while not dangerous in nature, they may occur at points where the attention of the engineer should be concentrated upon trackway conditions ahead and may therefore be a source of innoyance and inconvenience.

This condition is avoided in the present apparatus by the provision of a plurality of counting relays $L^1$, $L^2$, $L^3$ and $L^4$ which requires at least a given number of sequential operations of relay D in order to cause lamp 25 to become lighted. If the train is operating within train control territory and a coded signal is being transmitted to the train, the relays $L^1$, $L^2$, $L^3$ and $L^4$ are all energized by virtue of two stick circuits, one being from terminal *x*, through front contact 27 of decoding relay $R^1$, winding of relay $L^4$, front contact 28 of relay $L^3$, and winding of this relay to terminal *o*. The other of these circuits is from terminal *x*, through front contact 27 of decoding relay $R^1$, winding of relay $L^2$, front contact 29 of relay $L^1$, and winding of this relay to terminal *o*. If the coded signal is of 180 cycle frequency, the decoding relay $R^3$ will also be energized and cause the illumination of the "clear" signal lamp 23, by virtue of a circuit from terminal *x*, through front contact 30 of decoding relay $R^3$ and lamp 23 to terminal *o*. If a 120 cycle or "approach restricted" code is being received, the decoding relays $R^1$ and $R^2$ will be energized and cause the illumination of the lamp 24 by virtue of a circuit from terminal *x*, through back contact 30 of relay $R^3$, front contact 31 of relay $R^2$, and lamp 24 to terminal *o*. If an 80 cycle or "approach" code is being received, the decoding relay $R^1$ only will be energized, thereby causing the signal lamp 25 to be illuminated by virtue of a circuit from terminal *x*, through back contact 30 of relay $R^3$, back contact 31 of relay $R^2$, front contact 32 of relay $L^4$, front contact 33 of decoding relay $R^1$, and lamp 25 to terminal *o*.

I will now assume that the train is operating outside of train control territory and that the cab signaling apparatus is therefore not functioning. Under such condition the master relay D as well as the decoding relays $R^1$, $R^2$, and $R^3$ and also the counting relays $L^1$, $L^2$, $L^3$ and $L^4$ are all deenergized as shown in the drawing, and lamps 23, 24 and 25 are extinguished. Lamp 26 is lighted by a circuit which includes back contacts 30, 31 and 32, but for purposes of the present invention, this fact can be disregarded. If a rapid succession of unusually heavy surges or impulses of current are now produced in the track rails, such as may be caused by any of the conditions hereinbefore mentioned, the relay D may become energized and cause the contact 18 thereof to oscillate between its contacts 18$^a$—18$^b$ at the frequency of such surges. The first two strokes of the contact 18 from the position shown in the drawing will cause one cycle of alternating current to be produced in the circuit $C^1$ which, upon being rectified by the rectifier $h^1$, may be sufficient to energize the relay $R^1$ and cause it to close its front contact 34. Upon the next half stroke of the relay D, the contact 18—18$^a$ closes, thereby establishing a circuit from terminal *x*, through contact 18—18$^a$ of relay D, front contact 34 of relay $R^1$, back contact 35 of relay $L^2$, and winding of relay $L^1$ to terminal *o*. The current in this circuit energizes relay $L^1$ and causes it to close its front contact 29. Upon the next half stroke of relay D, contact 18—18$^a$ is opened, thereby interrupting at this point, the circuit just traced, but the relay $L^1$ is, however, maintained energized by virtue of the stick circuit previously traced through the contact 29 of this relay. This stick circuit energizes relay $L^2$ and causes it to close its front contact 35. Upon the next half stroke of relay D, contact 18—18$^a$ again closes, but this time the relay $L^3$ is energized by virtue of a circuit from terminal *x*, through contact 18—18$^a$ of relay D, front contact 34 of relay $R^1$, front contact 35 of relay $L^2$, back contact 36 of relay $L^4$, and winding of relay $L^3$ to terminal *o*. The energization of this relay causes it to close its front contact 28. Upon the next half stroke of relay D, contact 18—18$^a$ again opens and interrupts the circuit just traced, but the relay $L^3$ is maintained energized by virtue of the stick circuit previously traced through the contact 28 of this relay. This stick circuit also causes the energization of relay $L^4$ and causes it to open its back contact 36 and to close its front contact 32, thereby completing the circuit previously traced for the lamp 25, and necessitating an acknowledgment by the engineer, as before. However, the number of operations of relay D required for all of the counting relays L to become energized is greater than the oscillations due to a large majority of abnormal shock excitations, and consequently, the number of acknowledgments by the engineer is materially reduced.

It will be obvious that in order for shock excitations in the track rails to cause the energization of all of the relays L and the eventual illumination of the lamp 25, they must not only be of a frequency capable of energizing the decoding relay $R^1$ but they must occur in an uninterrupted sequence, as any break in the continuity of these excitations of any appreciable duration will cause the deenergization of the relay $R^1$, thereby opening the stick circuits for the relays L controlled by the contact 27 of this relay. This will necessitate that the relays L be reenergized in their regular order beginning again with the relay $L^1$ when the impulses resume at the termination of the period of interruption. Also, it will be apparent that if the train should enter train control territory in which an "approach" code is being transmitted over the track rails, the 80 cycle frequency of this code will cause the energization of the decoding relay $R^1$, the counting relays L, and the illumination of the lamp 25, as previously described. Inasmuch as there is no delay between the energization of either of the relays $R^2$ or $R^3$ and the lighting of the lamps 23 and 24, the "clear" and "approach restricted" indications will be displayed immediately upon the train entering train control territory in which such conditions exist. From the foregoing, it will be apparent that although the period of delay introduced between the energization of the decoding relay $R^1$ and the closing of the circuit controlling the "approach" indication lamp 25 is sufficient to prevent the lighting of this lamp in a majority of instances where the energization of the relay $R^1$ is due to shock excitations, this delay does not in any way impair the normal operation of the apparatus.

Although I have herein shown and described only one form of railway traffic controlling apparatus embodying my invention, it is understood that various changes and modifications may be made therein within the scope of the appended claims without departing from the spirit and scope of my invention.

Having thus described my invention, what I claim is:

1. Railway traffic controlling apparatus comprising a signal carried by a train, a relay $R^1$ for controlling the operation of said signal, a contact device for controlling the operation of relay $R^1$, a plurality of counting relays adapted to be energized in a predetermined sequence for controlling the operation of said signal, energizing circuits for certain of said counting relays controlled by said contacting device, and parallel energizing circuits for certain others of said counting relays controlled by relay $R^1$ and each including a stick circuit for one of said counting relays.

2. Railway traffic controlling apparatus comprising a signal carried by a train, a relay $R^1$ for controlling the operation of said signal, a contact device for controlling the operation of relay $R^1$, a plurality of counting relays adapted to be energized in a predetermined sequence for controlling the operation of said signal, an energizing circuit for one of said counting relays controlled by said contacting device, and a pick-up circuit for another of said counting relays controlled by relay $R^1$ and including a stick circuit for said one counting relay.

3. Railway traffic controlling apparatus comprising a signal carried by a train, a relay $R^1$ for controlling the operation of said signal, a contact device for controlling the operation of relay $R^1$, a plurality of counting relays adapted to be energized in a predetermined sequence for controlling the operation of said signal, an energizing circuit for one of said counting relays controlled by said contacting device, and a pick-up circuit for another of said counting relays controlled by relay $R^1$ exclusive of said contacting device.

4. Railway traffic controlling apparatus comprising a signal carried by a train, a relay $R^1$ for controlling the operation of said signal, a contact device for controlling the operation of relay $R^1$, a plurality of counting relays adapted to be energized in a predetermined sequence for controlling the operation of said signal, an energizing circuit for one of said counting relays controlled by said contacting device, and a pick-up circuit for another of said counting relays controlled by relay $R^1$ exclusive of said contacting device and including a stick circuit for said one counting relay.

5. Railway traffic controlling apparatus comprising a signal carried by a train, a relay $R^1$ for controlling the operation of said signal, a contact device for controlling the operation of relay $R^1$, a plurality of counting relays adapted to be energized in a predetermined sequence for controlling the operation of said signal, energizing circuits for certain of said counting relays controlled by said contacting device, and pick-up circuits for certain others of said counting relays controlled by relay $R^1$ exclusive of said contacting device.

6. Railway traffic controlling apparatus comprising a signal carried by a train, a relay $R^1$ for controlling the operation of said signal, a contact device for controlling the operation of relay $R^1$, a plurality of counting relays adapted to be energized in a predetermined sequence for controlling the operation of said signal, and parallel energizing circuits for certain of said counting relays controlled by relay $R^1$, said energizing circuits including the front contacts of certain others of said counting relays.

7. Railway traffic controlling apparatus comprising a signal carried by a train, a relay $R^1$ for controlling the operation of said signal, a contact device for controlling the operation of relay $R^1$, a plurality of counting relays adapted to be energized in a predetermined sequence for controlling the operation of said signal, and parallel energizing circuits for certain of said counting relays controlled by relay $R^1$, said energizing circuits including the windings of certain others of said counting relays.

8. Railway traffic controlling apparatus comprising a signal carried by a train, a relay $R^1$ for controlling the operation of said signal, a contact device for controlling the operation of relay $R^1$, a first and a second relay adapted to be energized in a given sequence for controlling the operation of said signal, an energizing circuit for said first relay controlled by said contacting device and including a back contact of said second relay, and a pick-up circuit for said second relay controlled by relay $R^1$ and including a front contact of said first relay.

GEORGE W. BAUGHMAN.